US006772066B2

(12) United States Patent
Cook

(10) Patent No.: US 6,772,066 B2
(45) Date of Patent: Aug. 3, 2004

(54) INTERACTIVE ROCK STABILITY DISPLAY

(75) Inventor: John Mervyn Cook, Cambridge (GB)

(73) Assignee: Schlumberger Technology Corporation, Ridgefield, CT (US)

( * ) Notice: Subject to any disclaimer, the term of this patent is extended or adjusted under 35 U.S.C. 154(b) by 0 days.

(21) Appl. No.: 10/173,379

(22) Filed: Jun. 17, 2002

(65) Prior Publication Data

US 2003/0233194 A1 Dec. 18, 2003

(51) Int. Cl.$^7$ ............................................. G01V 1/40
(52) U.S. Cl. ........................................... 702/6; 703/10
(58) Field of Search .............................. 702/16, 14, 6, 702/9; 345/419, 420; 703/10

(56) References Cited

U.S. PATENT DOCUMENTS

| | | | | |
|---|---|---|---|---|
| 6,021,377 A | * | 2/2000 | Dubinsky et al. | 702/9 |
| 6,078,867 A | | 6/2000 | Plumb et al. | 702/6 |
| 6,215,499 B1 | * | 4/2001 | Neff et al. | 345/419 |
| 6,233,524 B1 | * | 5/2001 | Harrell et al. | 702/9 |
| 6,313,838 B1 | * | 11/2001 | Deering | 345/420 |
| 6,574,566 B2 | * | 6/2003 | Grismore et al. | 702/16 |
| 2002/0059048 A1 | | 5/2002 | Hardy et al | 703/10 |

OTHER PUBLICATIONS

IADC/SPE 59121 *When Rock Mechanics met Drilling: Effective Implementation of Real–Time Wellbore Stability Control*, I.D.R. Bradford, J.M. Cook, E.F.M. Elewaut, J.A. Fuller, T.G. Kristiansen and T.R. Walsgrove (presented at the 2000 IADC/SPE Drilling Conference held in New Orleans, Louisiana, Feb. 23–25, 2000).

SPE/IADC 67816, *Meeting future Drilling Planning and Decision Support Requirements: A New Drilling Simulator*, H. –L. Balasch, J. Booth, I.D.R. Bradford, J.M. Cook, J.D. Dowell, G. Ritchie and I. Tuddenham (presented at the SPE/IADC Drilling Conference held in Amsterdam, The Netherlands, Feb. 27–Mar. 1, 2001).

Peska and Zoback, J Geophys. Research, *100*, 1995 12791–12811: Comprehensive and tensile failure of inclined well bores and determination of in situ stress and rock strength.

Fjaer et al, Petroleum Related Rock Mechanics, Elsevier, 1992 Chapter 4: Stresses around boreholes, and borehole failure criteria.

Geomechanics International: Information pack, Oct. 2000 or earlier.

Geomechanics International: Introduction letter, Jan. 2000.

Geomachanics International: Announcing GMI–Mohr–Francs Version.

Geomachanics International: Announcing GMI–Caliper Version 1.01, Oct. 2000 or earlier.

Geomachanics International: Announcing GMI–SFIB Version 3.5, Oct. 2000 or earlier.

Geomachanics International: Announcing GMI–Imager Version 4.3, Oct. 2000 or earlier.

* cited by examiner

*Primary Examiner*—John Barlow
*Assistant Examiner*—Victor J. Taylor
(74) *Attorney, Agent, or Firm*—William L. Wang; William B. Batzer; John J. Ryberg

(57) ABSTRACT

A method and system is disclosed for interactively displaying estimated stability of rock surrounding a wellbore. The display shows a three-dimensional representation of the orientation of a portion of the wellbore and the associated estimation of stability of the rock surrounding the wellbore. The user can alter the orientation of the portion of the wellbore, after which in real time the stability estimation is recalculated and redisplayed. The method and system can be used for planning or modifying a well plan, either before or during the drilling process. The method and system can also be used for diagnosis of stability problems. The method and system can also be used for displaying and analyzing the estimated stability of perforations surrounding a wellbore and for planning and arranging such perforations.

43 Claims, 6 Drawing Sheets

INTERACTIVE ROCK STABILITY DISPLAY

FIELD OF THE INVENTION

The present invention relates to the field of interactive displays for use in oilfield services applications. In particular, the invention relates to a three-dimensional interactive display for rock stability applications relating to wellbore construction.

BACKGROUND OF THE INVENTION

Wellbore instability and its associated drilling problems are a major source of lost time and excess cost when drilling. Planning for the management of instability is now becoming routine, but communicating information on instability prediction, for example to the diverse members of an asset or drilling team, can be difficult. This is because many parameters enter into the prediction, and displaying the influence of varying them all over their potential ranges is not possible with conventional charts or plots. There are also many outputs.

Three-dimensional displays for wellbore instability have been used in a demonstration drilling simulator. See, IADC/SPE 59121, *When Rock Mechanics Met Drilling: Effective Implementation of Real-Time Wellbore Stability Control*, I. D. R. Bradford, J. M. Cook, E. F. M. Elewaut, J. A. Fuller, T. G. Kristiansen, and T. R. Walsgrove (presented at the 2000 IADC/SPE Drilling Conference held in New Orleans, La., Feb. 23–25, 2000); and SPE/IADC 67816, *Meeting Future Drilling Planning and Decision Support Requirements: A New Drilling Simulator*, H.-L. Balasch, J. Booth, I. D. R. Bradford, J. M. Cook, J. D. Dowell, G. Ritchie, and I. Tuddenham (presented at the SPE/IADC Drilling Conference held in Amsterdam, The Netherlands, Feb. 27–Mar. 1, 2001). These displays were implemented using a scientific programming language known as Matlab.

Colored polar plots have been used to display the results of instability planning. For example polar colormap plots of the severity of potential instability for wells at different orientations have been implemented by Baker Hughes and Geomechanics International. These techniques show the influences of changing the well azimuth and deviation, with all other parameters fixed. The color used at a particular point in the polar plot depends on how much instability is predicted at the appropriate orientation. However, techniques such as these are of limited use due in part to the following:

1. the person viewing must have an appreciation of how a polar plot presents information; this is not a display method familiar to many people outside geology and crystallography;
2. the instability function must be integrated around the circumference of the well, in order to generate a single value for the colormap; this masks useful details of the circumferential variation (e.g., its potential use in image log interpretation); and
3. the plots are relatively slow to generate, since they have to cover a wide range of parameter space, but are then fixed; any change in the earth parameters means a time-consuming recalculation of the whole plot.

Finally, Three-dimensional displays have recently been used successfully to convey instability information for a fixed trajectory in a fixed earth model. However, these techniques suffered in that they were not interactive with the user. This is primarily because if the parameters of the trajectory or earth model are changed, considerable recomputation is required to display the new results, and there is no user-friendly method of changing the trajectory of the wellbore.

SUMMARY OF THE INVENTION

Thus, it is an object of the present invention to provide a system and method for interactively displaying rock stability information to a user in three-dimensions.

According to the invention a system is provided for interactively displaying estimated stability of rock surrounding a wellbore comprising:

a three-dimensional display adapted to display to a user an orientation of a portion of the wellbore and an estimation of stability of the rock surrounding the portion of the wellbore;

a user input system adapted to accept user input representing changes in orientation of the portion of the wellbore; and a processing system adapted to accept the user input from the user input system and calculate and communicate to the display a revised estimation of stability of the rock based on the user input.

Also according to the invention, a method is provided for interactively displaying estimated stability of rock surrounding a wellbore comprising the steps of:

displaying to a user a three-dimensional representation of a first orientation of a portion of the wellbore and a first estimation of stability of the rock surrounding the portion of the wellbore associated with the first orientation;

receiving user input representing a second orientation of the portion of the wellbore;

calculating a second estimation of stability of the rock associated with the second orientation; and displaying to the user in real time a three-dimensional representation of the second orientation of the portion of the wellbore and the second estimation of stability of the rock.

DETAILED DESCRIPTION OF THE INVENTION

Figure 1:
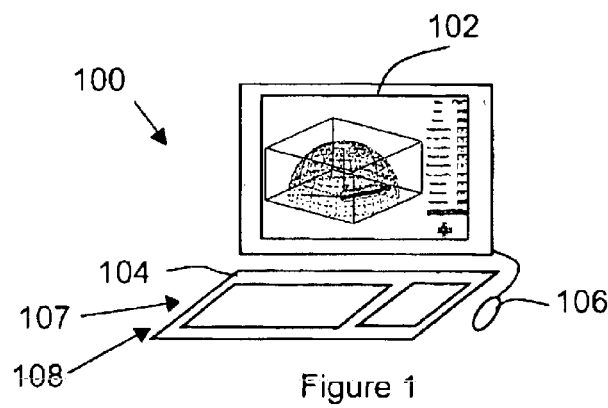
FIG. 1 shows an interactive stability display according to a preferred embodiment of the invention.

According to a preferred embodiment of the invention, an interactive display is provided that displays the predicted failure state of the rock around the wellbore directly and graphically, using a 3-dimensional display with a "click and drag" interface to change the well orientation, and simple methods to choose earth and drilling parameters. The display can be used to convey, quickly and convincingly, the differences between drilling in different directions or at different deviations, and the effects of changes in mud weight, in-situ stress and rock properties. It can also be used as an interpretation tool for comparing predicted deformation patterns against well data, for example to establish bounds on the stress state. According to one embodiment the display is used as a fully-functional instability predictor by a oilfield service engineer who is planning wells for a client. According to this embodiment, any of the parameters can be changed by the user.

According to another embodiment, the display is used by an oilfield asset owner or operator. According to this embodiment either some or all of earth and rock parameters are hardwired in, and the user is only allowed to change well orientation, mud weight and a limited number of other parameters. For example, the users could view a 3-D display on their own computer, examining the effects of changes in well orientation, but not being able to alter the stress state.

The wellbore instability predictions that are displayed according to the invention are preferably based on calculations of the stress state around the wellbore, and of the response of the rock to these stresses. Even more preferably, the predictions are based on an elastic model of rock behavior, which are known to be conservative but having a clear advantages in terms of speed, intelligibility, and amount of rock data required. Examples of these types of calculations that can be used form the basis of codes used by Schlumberger such those known as Roxan™, RockSolid®, and IMPACT®. See also, Peska and Zoback, J. Geophys. Research, 100, 1995 12791–12811; and Fjaer et al, Petroleum Related Rock Mechanics, Elsevier, 1992, Chapter 4. Alternatively various other mechanical models can be used, with some being more complex models of rock behavior, for example by incorporating plasticity. In accordance with the invention, an elastic model is preferred because calculations of plasticity around the wellbore can be time-consuming. However, under some circumstances where response time is less important or a high degree of processing power is available, a more complex model such as one incorporating plasticity could be used. According to the invention a relatively fast response time is an important feature of the interactive display so that the results of the instability calculations can be viewed by the user as the wellbore is moved around. The fast response time advantageously increases the usability and appeal of the display among a wide range of users.

FIG. 1 shows an interactive stability display according to a preferred embodiment of the invention. Interactive stability display 100 comprises a display screen 102, a processor 107, a storage system 108, and user input devices including a keyboard 104 and pointing device 106. According to a preferred embodiment Interactive display 100 is implemented on a personal computer, and even more preferably on a laptop personal computer. The interactive stability display 100 can be programmed in a language such as Matlab®, although it is preferably implemented directly in a Language such as C++. The display screen 102 is a two-dimensional personal computer display, and even more preferably a LCD laptop screen. Display screen 102 may comprise a number of windows or other information associated with other applications or processes running on the personal computer. Providing interactive display 100 on a laptop computer greatly enhances the wide range of working environments for the user. Keyboard 104 is preferably a laptop keyboard. Pointing device 106 is preferably a mouse, track pad, trackball, joystick, but could alternatively be any other pointing devices useable with a personal computer.

Figure 2:
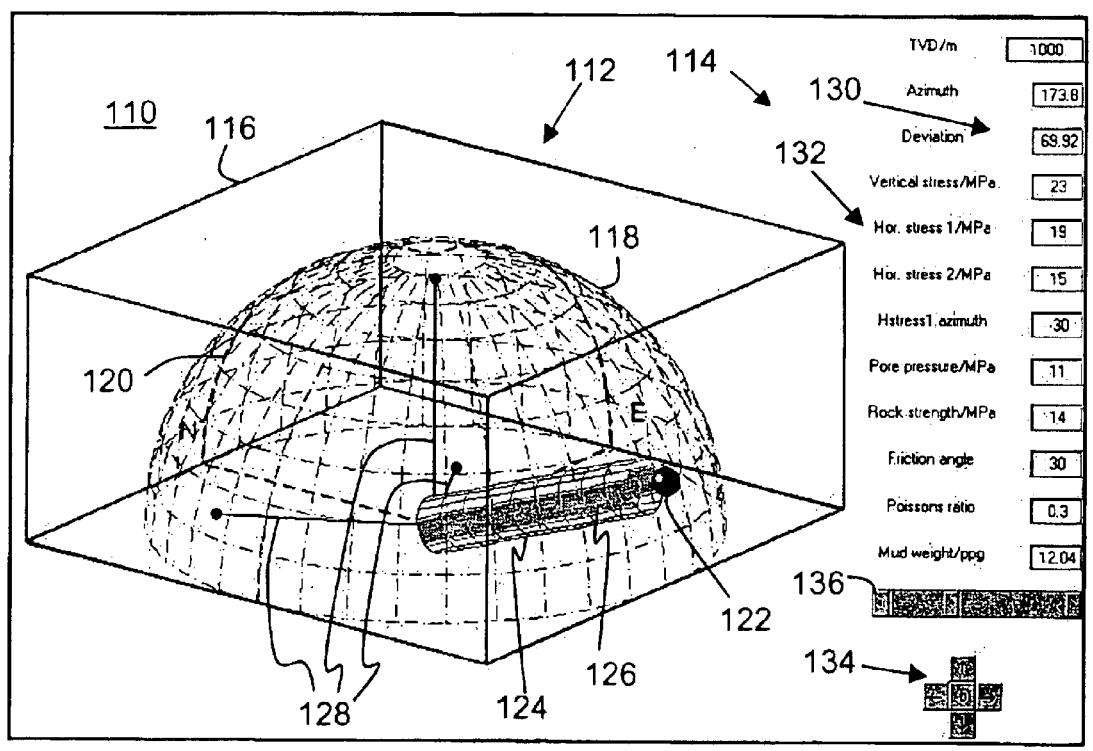
FIG. 2 shows features of the display screen, according to a preferred embodiment of the invention.

FIG. 2 shows features of the display screen, according to a preferred embodiment of the invention. One of the main windows displayed on display screen 102 is graphics window 110. Graphics window 110 comprises primarily a three dimensional (3-D) display 112 and parameter information 114. As used herein the phrases "three-dimensional display", "three-dimensional representation" and "3-D display" include true three-dimensional display techniques (e.g. volumetric and holographic displays), stereoscopic three-dimensional display, and two-dimensional representations of three-dimensional (e.g. perspective projection and parallel projection). According to a preferred embodiment, 3-D display 112 is a parallel projection display. This has the advantage of not requiring high levels of processing power or special hardware beyond an ordinary monitor for a personal computer. The 3-D display 112 displays to the user a three-dimensional representation of stability information of rock surrounding a wellbore. The 3-D display 112 preferably shows: a bounding box 116 to aid in 3-D orientation; a North/East/down coordinate system shown by broken lines 120; the orientations and relative magnitudes of the principal stresses indicated with axes 128; a hemispherical grid 118 to guide the user in orienting the portion of the wellbore; and a portion of the wellbore itself 124, whose orientation can be changed with the pointing device 106 using the small ball 122 (preferably brightly colored) as a handle. The portion of the wellbore displayed is preferably relatively short such that the parameters including rock properties, orientation and mud weight, do not vary over the length of the portion. This allows for rapid recalculation of the predicted stability information. For example, it has been found that portions of 1 meter are suitable. In general the suitable length depends in part on the variability of the particular rock surrounding the wellbore. However, if sufficient computational speed is available, the portion of the wellbore used could be longer, up to the entire length of the well. It is also preferable that the aspect ratio of the width and length of the displayed portion of the wellbore is maintained to improve usability. In practice, portions of less than 5 meters are preferred if the displayed aspect ratio is to be maintained.

Buttons 134 are used for rotating the axes to manipulate the viewing angle. It will be appreciated that buttons 134 can also be used to display a plan view to the user. 3-D display 112 importantly displays a prediction of the stability (or instability) state of the rock surrounding the portion of the wellbore 124. This information is preferably displayed using an outline surface around the portion of the wellbore, where the color of different parts of the surface indicates the predicted stability of the corresponding surrounding rock. For example, in FIG. 2 the shaded part of the outline surface 126 is preferably displayed in a red color and the unshaded portion is displayed in blue color. In the example of FIG. 2, the red shaded part 126 indicates clearly to the user that rock failure is predicted in those portions of the rock surrounding the portion of the wellbore.

The parameter information portion 114 of the display comprises a number of boxes for entering and displaying various parameters relating to the stability of the rock surrounding the portion of the wellbore preferably including: stress magnitudes and orientations, rock strength parameters, and the true vertical depth. The true vertical depth is preferably used only to convert fluid density (e.g.

mud weight) to fluid pressure (e.g. mud pressure). Parameter information portion 114 also includes boxes that can be used to display and change wellbore azimuth and deviation, and mud weight. However, according to a preferred embodiment, these parameters are more easily changed using the three-dimensional display 112 and a mud weight slider 136 respectively, and the boxes 130 display the values of the parameters. Although the parameter information portion 114 is shown to display certain preferred parameters, according to other embodiments other parameters could also be displayed and/or manipulated by the user, such as rock plasticity parameters, fluid flow rates, temperatures, chemical and electrochemical properties, and time since drilling.

According to a preferred embodiment, the instability predictions displayed in 3-D display 112 are based on inputs including: the magnitudes of the three principal stresses in the earth at the depth of interest; their orientation relative to North; the pore pressure; the rock strength, friction angle and Poisson's ratio; the azimuth and deviation of the well; and the fluid pressure (e.g. mud pressure) in the wellbore. These are used to rotate the in-situ stress field into the wellbore coordinate system; then to calculate the stress concentration around the portion of the wellbore preferably using an elastic model; then to compare the maximum and minimum local principal stresses to an appropriate failure criterion (for example, the Mohr-Coulomb criterion). The result is a function representing the extent by which the local stress state exceeds the strength of the rock; in simple terms whether the rock has failed and by how much. This function is evaluated at a number of points around the portion of the wellbore circumference and displayed in real-time to the user via colored shading such as shaded part 126 around portion of the wellbore 124 in 3-D display 112.

Whenever a parameter is changed, or the portion of the wellbore orientation is changed, the equations for the stress state and failure conditions around the wellbore are re-calculated, and the color shading 126 of the portion of the wellbore 124 is re-mapped to the value of the failure function. Although any coloring scheme could be used, the invention preferably makes use of colors that are quickly and clearly distinguishable by the user. According to a preferred coloring scheme, the color of the surface around the wellbore changes from blue through mauve to red as the failure function moves from negative or zero (no failure under the local stress state) through small positive values (mild rock failure) to large positive values (severe rock failure). Because the calculations are preferably carried out using an elastic model, they are very quick, and so the wellbore color map, indicating the failure state, is updated as the portion of the wellbore is moved with the mouse, giving a high degree of interactivity with the user.

According to another embodiment, the shape of the surface surrounding the wellbore is distorted such that the cross section of the surface is no longer round, in order to display to the user an indication of the severity of the rock failure. As with the simple color shading approach, this is very rapid and changes as the wellbore is moved. The shape distortion can be used alone or preferably in combination with the color shading approach.

Since the display shows both the extent of the potential damage to the wellbore, and its location, it can be used both as a tool to examine and demonstrate the effects of drilling at different orientations and with different mud weights, and also to interpret image logs that show wellbore damage, such as resistivity at the bit (RAB) logs. Interpretation of the position of the damage can help clarify the orientations and magnitudes of the principal stresses in the earth.

Figure 3:
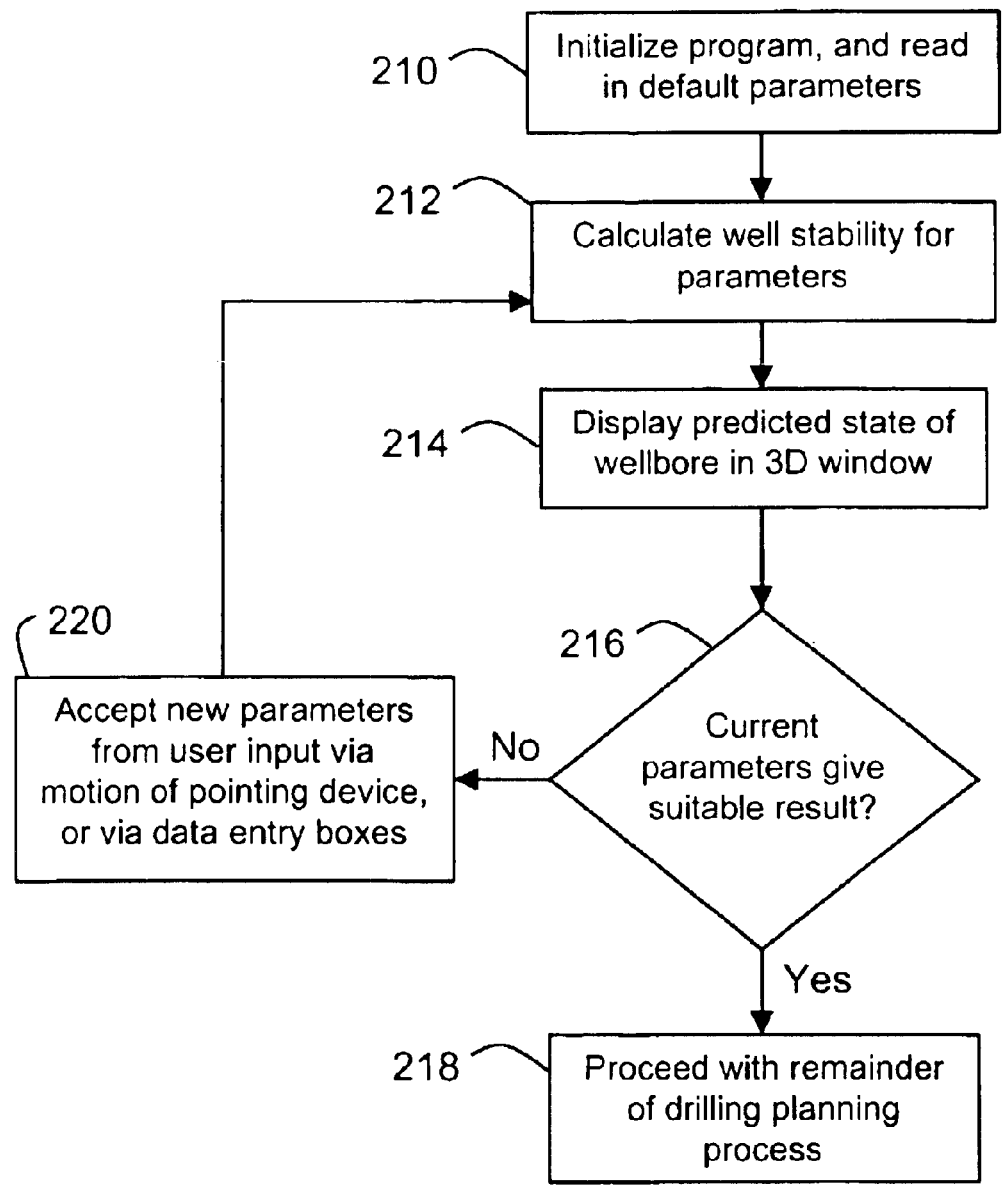
FIG. 3 is a flow chart showing processing steps according to the invention as implemented on a computer.

FIG. 3 is a flow chart showing some processing steps according to the invention as implemented on a computer. In step 210 the program is initialized and a set of default parameters are read from memory. These default parameters could be originally obtained from an earth model, or may be setup for the particular region which the invention is intended to be used. In step 212 the stability of the rock surrounding the wellbore is predicted based on the current parameters. Following the initialization step 210, the stability calculations in step 212 would be based on the default parameters.

In step 214 the predicted stability of the rock surrounding the wellbore is displayed to the user using a 3-D display, preferably as described above with respect to FIG. 2. As discussed above, the calculations underlying the predicted stability are performed and the predicted stability is displayed in real time in order to give the display a high degree of interactivity. In particular the delay time for recalculation (and preferably re-display) in real time based on a change in the orientation of the portion of the wellbore by the user is preferably less than 2 seconds, and even more preferably is less than 0.2 seconds.

In step 216 a determination is made as to whether the parameters being used give a suitable result in terms of stability of the rock surrounding the portion of the wellbore. This determination is preferably made by the user based on the viewing the stability information being displayed on the 3-D display and the current parameters. If the current parameters are not suitable, the user indicates this by entering in new parameters, step 220, by moving the pointing device to change the orientation of the well or mud weight, and/or changing the parameter values in the data entry boxes. If the user determines that the current parameters are suitable, in step 218 the user proceeds with the remainder of the drilling process. The user preferably indicates the parameter acceptability to the computer program which then records and saves the current parameters for future use. Alternatively, the user can record the suitable parameters manually or electronically elsewhere on the computer. In practice, the user is often interested most in the mud weight and trajectory of the wellbore, given the parameters set by the drilling environment.

Figure 4:
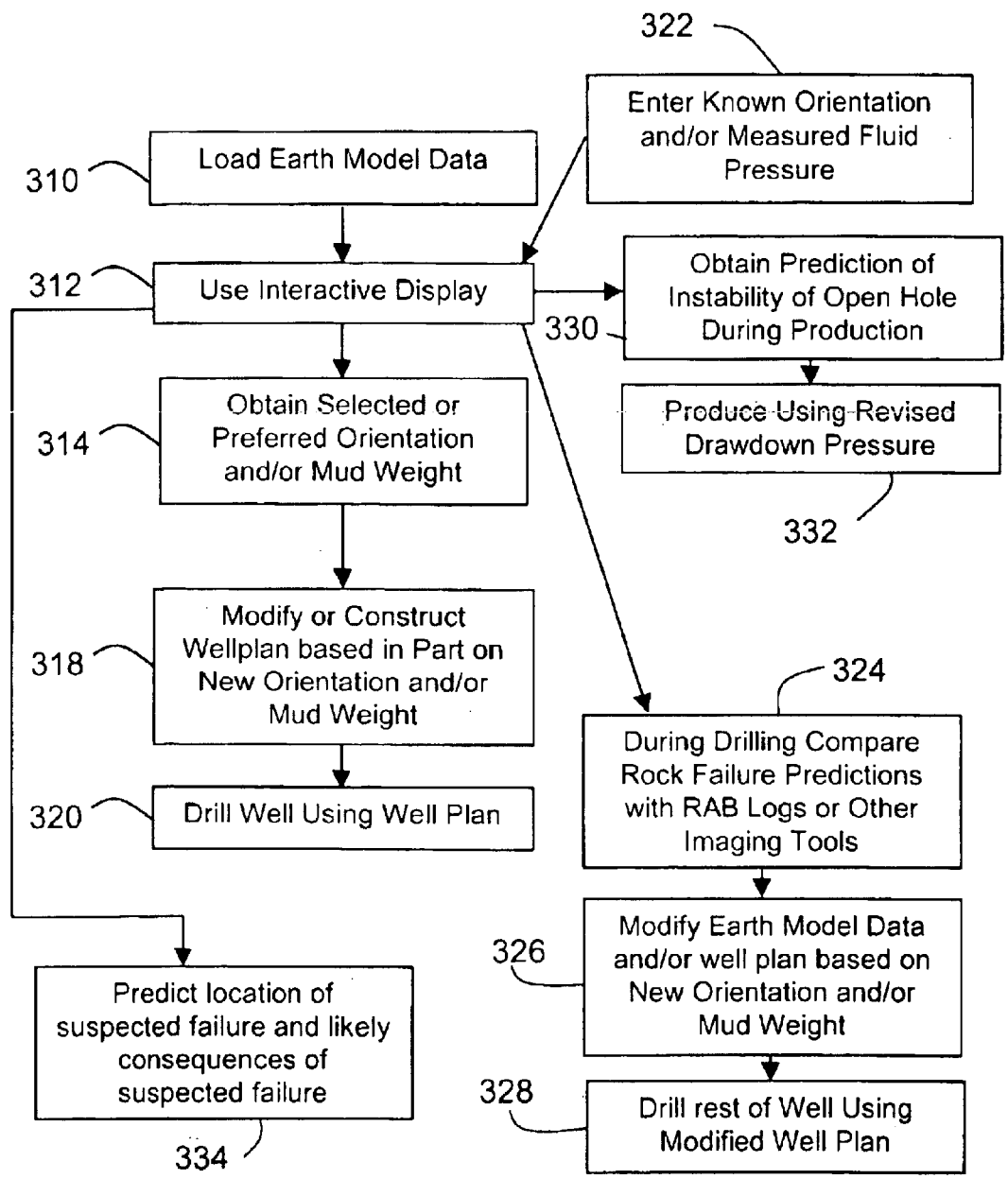
FIG. 4 is a flow chart showing steps of planning and drilling a well according to a preferred embodiment of the invention.

FIG. 4 is a flow chart showing steps of planning and drilling a well according to certain embodiments of the invention. In step 310 at least some of the parameters used by the interactive display are loaded from an existing earth model. In step 312 the user uses the interactive display. In this case, the parameters from the earth model are used as some or all of the initial parameters in step 210 of FIG. 3. In step 314 the selected or preferred parameters, typically the orientation and/or mud weight are obtained from the interactive display. In step 318 the preferred orientation and/or mud weight are used to construct or modify a well plan. For example, in light of the preferred orientations obtained in step 314, the planned trajectory is modified to incorporate one or more of the preferred orientations, or incorporate orientations approximating one or more of the preferred orientations, into an existing well plan. Finally, in step 320 a well is drilled using the constructed or modified well plan.

According to another embodiment of the invention, the interactive stability display is used during a drilling operation. During drilling, in step 322 the known orientation and a measured fluid pressure (mud pressure in this case) are entered as parameters in the interactive display. Other parameters may be used from an earth model (step 310). In step 312 the user uses the interactive display. In step 324, the rock failure predictions from the interactive display are compared to information acquired from RAB logs or other imaging tools taken from the well during the drilling process. If an inconsistency is identified between the measured and predicted information, either the earth model can be updated, the well plan can be modified (e.g. with a new trajectory and/or mud weight), or both. In step 328, the remainder of the well is drilled using the modified well plan.

According to another embodiment the interactive display can be used to predict rock stability in an open hole during production. According to this embodiment, in step 322 the known orientation for a portion of the open hole wellbore and the measured fluid pressure (in this case the pressure of the production fluid) is entered into the interactive display along with data from an earth model. In step 312 the interactive display is used. In step 330 rock stability predictions are obtained for the open hole wellbore. In light of the stability predictions a preferred or selected drawdown pressure is obtained, and in step 332, the production is carried out using the preferred drawdown pressure.

Alternatively, according to another embodiment, in step 334, the interactive stability display can be used to diagnose a problem encountered during drilling or during production. For example, if a rock failure is suspected in an open hole section of the wellbore during production, the interactive stability display can be used to aid in evaluating the likely location of the failure (in terms of both depth and circumferential position) and consequences (e.g. crushing of a screen, or disruption of gravel pack).

Figure 5:
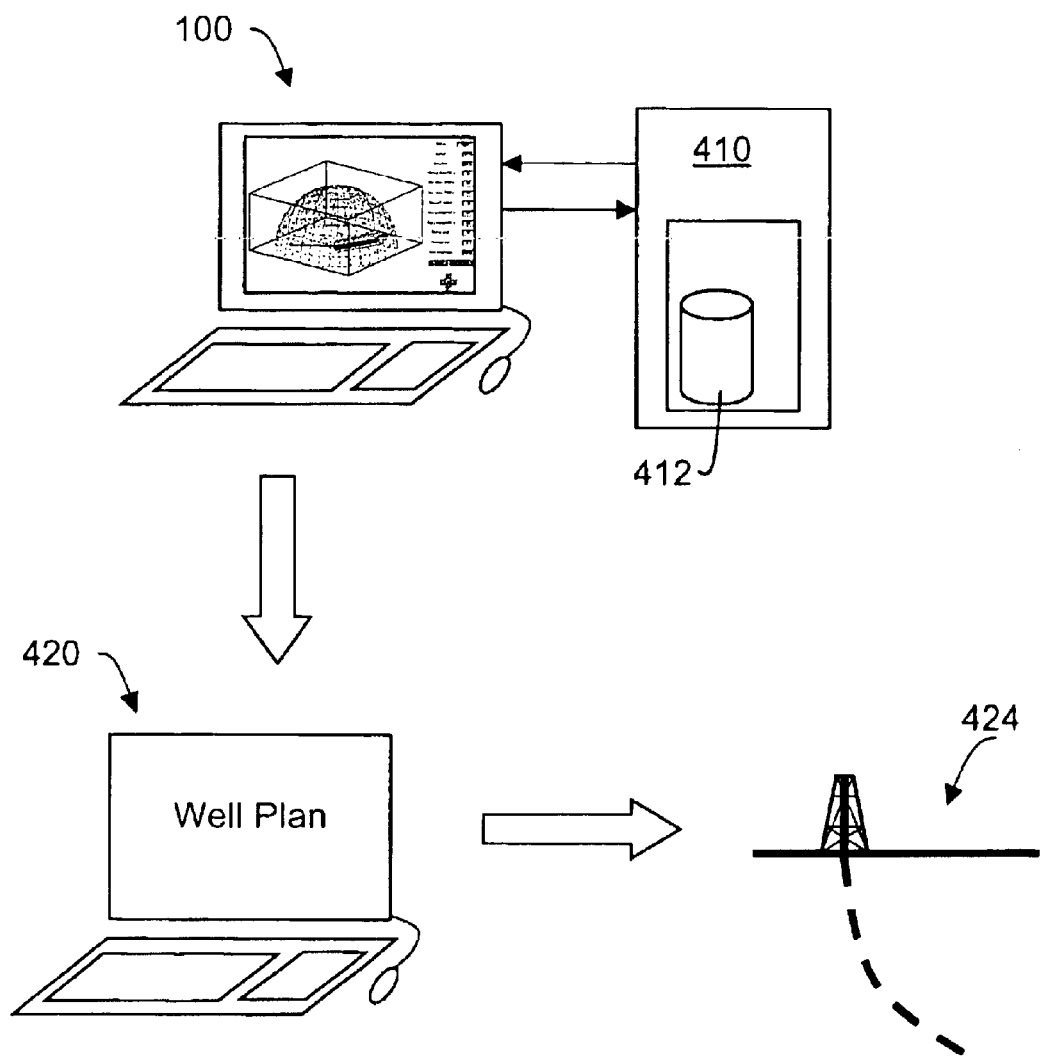
FIG. 5 is a diagram showing the implementation of an interactive stability display used to create a well plan and drill a well, according to a preferred embodiment of the invention.

FIG. 5 is a diagram showing the implementation of an interactive stability display used to create a well plan and drill a well, according to a preferred embodiment of the invention. According to this embodiment, interactive stability display 100 is running on a laptop PC. The interactive stability display 100 obtains at least some of the parameters used in predicting the stability of the rock surrounding the wellbore from an earth model stored on storage system 412 of computer system 410. Computer system 410 can be directly connected to the laptop PC via a network connection or dial-up connection, or it could be connected via a wireless connection. Furthermore, the connection between computer system 410 and the laptop PC can be permanent but is preferably temporarily established to load initial parameters and settings and to record and store output parameters such as orientation and/or mud weight. In some cases some data in the earth model can be updated in light of the results from the interactive stability display 100.

The selected orientation and or mud weight is then used to construct or modify a well plan, as described above. The well plan may be on a separate computer 420 as shown in FIG. 5, the same laptop PC as display 100, or it may be produced and used in hard-copy form. According to the invention, the well plan on computer 420 is then used to drill a well 424.

Figure 6:
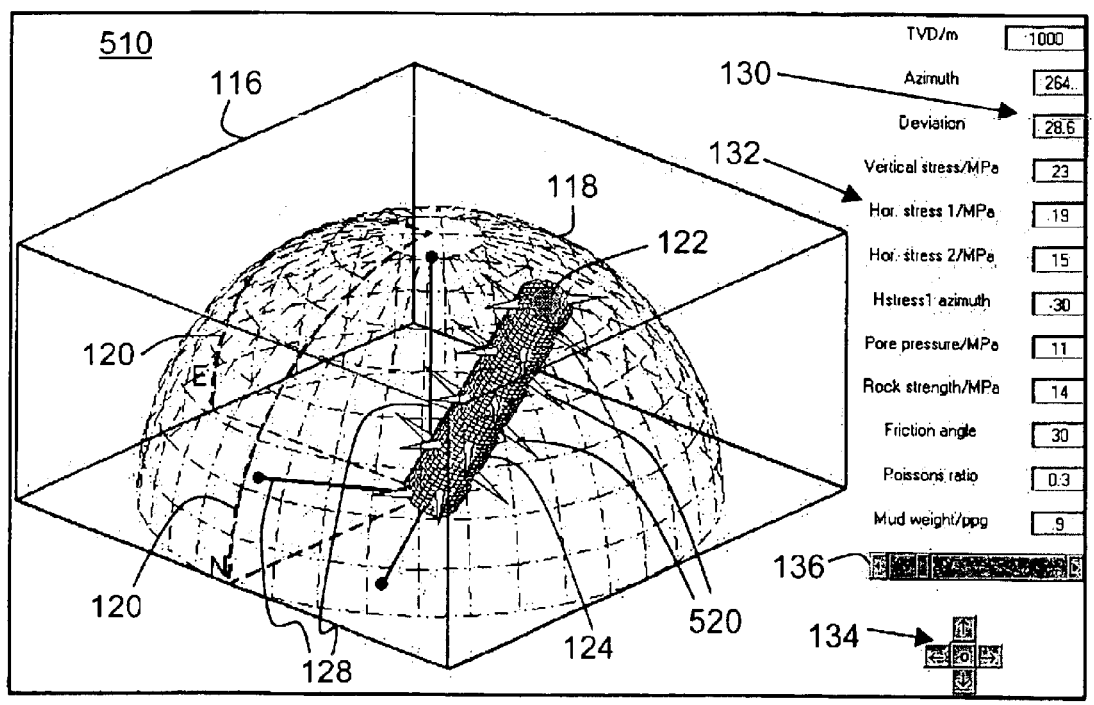
FIG. 6 shows a portion of an interactive stability display according to another embodiment of the invention.

FIG. 6 shows a portion of an interactive stability display according to another embodiment of the invention. In particular the window 510 is preferably used when planning the location and arrangement, or phasing, of perforations made during well completion in order to establish fluid communication between the surrounding reservoir rock and a conduit within the wellbore used to produced fluids. Many of the features of window 510 are as described with respect to FIG. 2 above. According to a preferred embodiment, the outer surface of the portion of the wellbore 124 is not shaded, but rather the perforations 520 are each shaded with colors according to the predicted stability of the rock surrounding the perforation. The surface of the wellbore 124 does not ordinarily need any color shading since the wellbore is normally cased at the time the perforations are shot.

The perforations 520 can also be arranged and relocated with respect to the portion of the wellbore preferably by clicking on the perforation and dragging the perforation to a new location. The user can also add new perforations through a menu or similar means. Other techniques could be used to add, delete, and move the location of perforations including: menus, radio buttons and the like. Another option for changing the arrangement of the perforations that is provided is for the user to rotate some or all of the perforations about the central axis of the portion of the wellbore.

According to the preferred embodiment, the perforations are always positioned perpendicular to the central axis of the portion of the wellbore because this is how most if not all perforations are commercially made. However, according to another embodiment of the invention the interactive display could allow for the changing of the inclination angle and orientation of a perforation relative to the central axis of the portion of the wellbore, which is initially set at 90 degrees. According to another embodiment, the length of a perforation can be changed from an initial value by right clicking on the perforation and entering a value in a pop up menu. According to another embodiment, a perforation can be selected by right clicking and then from a menu the user can choose to have a detailed view of the perforation in a format similar to that shown by the portion of the wellbore 124 and shaded area 126 in FIG. 2, except that the surface and shading represents the stability of the selected perforation instead of a wellbore.

Figure 7:
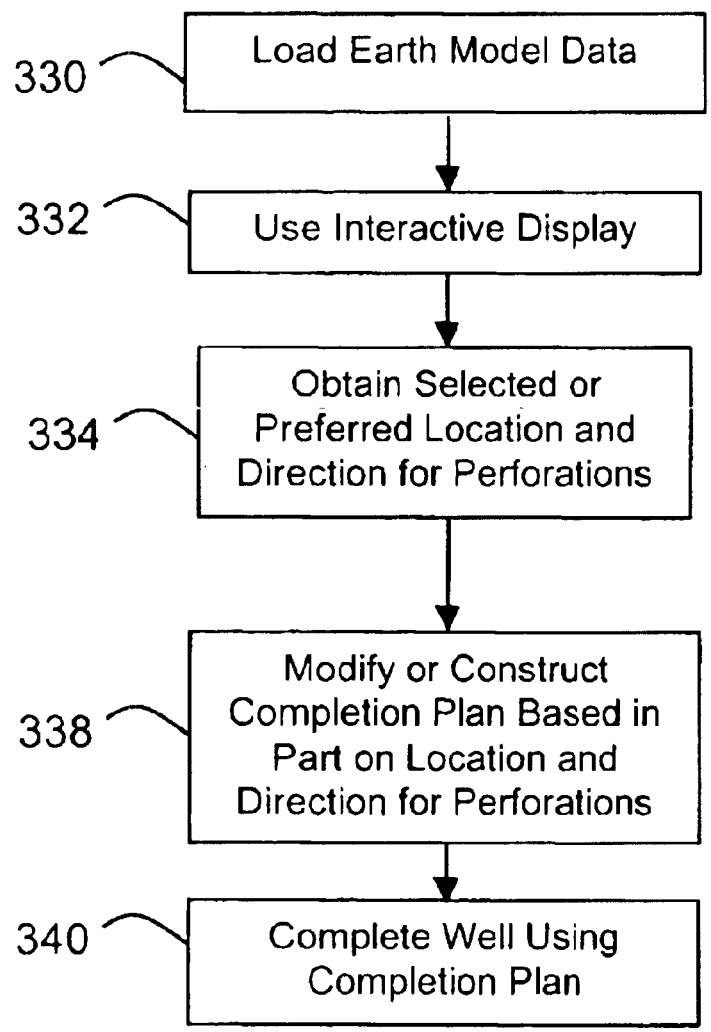
FIG. 7 is a flow chart showing steps of making a completion plan and perforating a well according to an embodiment of the invention.

FIG. 7 is a flow chart showing steps of making a completion plan and perforating a well according to an embodiment of the invention. In step 330 at least some of the parameters used by the interactive display for planning perforations are loaded from an existing earth model. In step 332 the interactive display for planning perforations is used by the user. In step 334 the selected or preferred parameters, typically the preferred location and direction for the perforations are obtained from the interactive display. In step 338 the preferred location and direction of the perforations are used to construct or modify a completion plan. Finally, in step 340 a well is perforated using the completion plan. It will be appreciated that the implementation shown in FIG. 5 and described above can be used with the embodiments for planning perforations for a well.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

What is claimed is:

1. A system for interactively displaying estimated stability of rock surrounding a wellbore comprising:

a three-dimensional display adapted to display to a user an orientation of a portion of the wellbore and an estimation of stability of the rock surrounding the portion of the wellbore;

a user input system adapted to accept user input representing changes in orientation of the portion of the wellbore; and a processing system adapted to accept the user input from the user input system and calculate and communicate to the display a revised estimation of stability of the rock based on the user input.

2. A system according to claim 1 wherein the processing system is adapted to in real time calculate and communicate to the display the revised estimate.

3. A system according to claim 2 wherein the processing system is adapted to calculate and communicate to the display the revised estimate in less than 2 seconds.

4. A system according to claim 3 wherein the processing system is adapted to calculate and communicate to the display the revised estimate in less than 0.2 seconds.

5. A system according to claim 1 the processing system is adapted to calculate the revised estimation using other parameters relating to rock properties in combination with the user input representing changes in orientation of the portion of the wellbore.

6. A system according to claim 5 wherein the other parameters are assumed to be constant over the portion of the wellbore.

7. A system according to claim 1 wherein the user input system is further adapted to accept user input representing changes in fluid pressure associated with the portion of the wellbore.

8. A system according to claim 7, wherein the fluid pressure is a mud weight.

9. A system according to claim 1 further comprising a well plan for specifying characteristics of a wellbore to be drilled, the well plan incorporating information related to at least one orientation displayed to the user with the three-dimensional display.

10. A system according to claim 9, wherein the well plan is stored on a storage system of a second processing system, the at least one orientation is an orientation selected by the user as being preferred for the portion of the wellbore, and the well plan comprises a trajectory that includes at least an approximation of the selected orientation for a portion of the trajectory.

11. A system according to claim 1 wherein the estimation and revised estimation are calculated by the processing system based on parameters including one or more of the following: magnitudes of three principal stresses in the vicinity of the portion of the wellbore, orientation of the three principal stresses relative to North; pore pressure of the rock, strength of the rock, friction angle and Poisson's ratio, azimuth and deviation of the well, and the fluid pressure in the portion of the wellbore.

12. A system according to claim 11, wherein the estimation and revised estimation are calculated by the processing system based further on parameters including one or more of the following: plasticity of the rock, fluid flow rates in the rock, temperatures of the rock, chemical and electrochemical properties of the rock, and time since drilling of the portion of the wellbore.

13. A system according to claim 1 wherein the three-dimensional display comprises a parallel projection display or a perspective projection display.

14. A system according to claim 1 wherein the estimation of stability is displayed to the user such that it indicated to the user a prediction of likelihood of rock failure at different places on the portion of the wellbore.

15. A system according to claim 14, wherein the three-dimensional display displays the estimation of stability using different colors to indicate the predicted likelihood of rock failure at different places on the portion of the wellbore.

16. A system according to claim 1 wherein the orientation includes both azimuth and inclination angle from vertical.

17. A system according to claim 1 wherein the three-dimensional display is adapted to display a bedding plane of the rock.

18. A system according to claim 1 wherein the three-dimensional display includes representations of the location of one or more perforations relative to the portion of the wellbore and the estimation of stability includes estimated stability of the rock surrounding each of the one or more perforations.

19. A system according to claim 18, wherein the user input system is further adapted to accept user input representing the addition, deletion, and changes in location of the one or more perforations.

20. A system according to claim 18, wherein the user input system is further adapted to accept using input representing changes in orientation of each of the one or more perforations with respect to a central axis of the portion of the wellbore.

21. A system according to claim 1 wherein estimation of stability and the revised estimation of stability are calculated by the processing system using an elastic model.

22. A system according to claim 1 wherein estimation of stability and the revised estimation of stability are calculated by the processing system using an model incorporating plasticity.

23. A system according to claim 1 wherein the portion of the wellbore is less than 5 meters.

24. A method for interactively displaying estimated stability of rock surrounding a wellbore comprising the steps of:

displaying to a user a three-dimensional representation of a first orientation of a portion of the wellbore and a first estimation of stability of the rock surrounding the portion of the wellbore associated with the first orientation;

receiving user input representing a second orientation of the portion of the wellbore;

calculating a second estimation of stability of the rock associated with the second orientation; and displaying to the user in real time a three-dimensional representation of the second orientation of the portion of the wellbore and the second estimation of stability of the rock.

25. A method according to claim 24 wherein the processing system is adapted to in real time calculate and communicate to the display the revised estimate.

26. A method according to claim 24 wherein the step of calculating the second estimation is performed in less than 2 seconds.

27. A method according to claim 26 wherein the step of calculating the second estimation is performed in less than 0.2 seconds.

28. A method according to claim 24 the step of calculating the second estimation uses other parameters relating to rock properties in combination with the user input representing the second orientation.

29. A method according to claim 24 further comprising the step of receiving user input representing a fluid pressure associated with the portion of the wellbore, and the step of calculating the second estimation is based in part on the fluid pressure.

30. A method according to claim 29 further comprising the steps of:

selecting a preferred fluid pressure; and creating or modifying a well plan specifying characteristics of a wellbore to be drilled, the well plan incorporating the preferred fluid pressure.

31. A method according to claim 29 wherein the method is carried out after production of hydrocarbons has begun with the wellbore, the fluid pressure is a drawdown pressure, and the method further comprises the step of producing hydrocarbons at a selected drawdown pressure that has been selected at least in part by the user viewing the display of the second estimation.

32. A method according to claim 24 further comprising the steps of:
repeating the steps of receiving user input, calculating, and displaying for further orientations;
selecting a preferred orientation; and
creating or modifying a well plan specifying characteristics of a wellbore to be drilled, the well plan incorporating the preferred orientation.

33. A method according to claim 32 further comprising drilling at least a portion of a well using the created or modified well plan.

34. A method according to claim 24 wherein the first and second estimations are calculated based on parameters including one or more of the following: magnitudes of three principal stresses in the vicinity of the portion of the wellbore, orientation of the three principal stresses relative to North; pore pressure of the rock, strength of the rock, friction angle and Poisson's ratio, azimuth and deviation of the well, and the fluid pressure in the portion of the wellbore.

35. A method according to claim 24 wherein the three-dimensional representation comprises a parallel projection display or a perspective projection display.

36. A method according to claim 24 wherein the first and second estimations include predictions of likelihood of rock failure at more than one place on the portion of the wellbore.

37. A method according to claim 24 wherein the steps of displaying include displaying representations of the location of one or more perforations relative to the portion of the wellbore and wherein the first and second estimations of stability include estimated stability of the rock surrounding each of the one or more perforations.

38. A method according to claim 37 wherein the step of receiving user input includes receiving user input representing the addition, deletion, and changes in location of the one or more perforations.

39. A method according to claim 24 wherein first and second estimations of stability are calculated using an elastic model.

40. A method according to claim 28 wherein the other parameters are assumed to be constant over the portion of the wellbore.

41. A method according to claim 24 wherein the portion of the wellbore is less than 5 meters.

42. A method according to claim 24 further comprising the step of comparing the at least the first or second estimation of stability with data from an imaging tool, and wherein the method is carried out after the start of drilling and before ending of drilling of the wellbore.

43. A method according to claim 42 further comprising the steps of:
modifying a well plan based on a new orientation or mud weight; and
drilling portions of the wellbore according to the modified well plan.

* * * * *